(Model.)
D. G. BROWN.
MICROMETER PIPE GAGE.
No. 368,563. Patented Aug. 16, 1887.
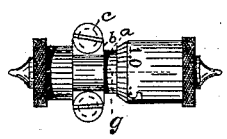
Fig. 1.
  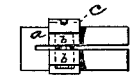  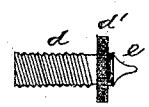
Fig. 2. Fig. 3. Fig. 4. Fig. 5. Fig. 6.
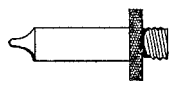 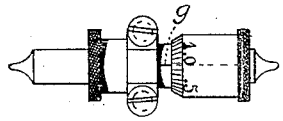 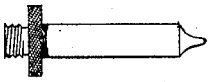
Fig. 7. Fig. 8. Fig. 9.
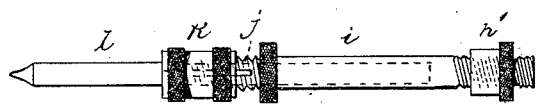
Fig. 10.
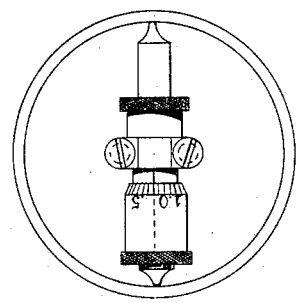
Fig. 11.
Witnesses:
Fredk. F. Campbell.
Oscar A. Michel.
Inventor:
David G. Brown,
by Drake & Co,
Attys.

UNITED STATES PATENT OFFICE.

DAVID G. BROWN, OF PHILADELPHIA, PENNSYLVANIA.

MICROMETER PIPE-GAGE.

SPECIFICATION forming part of Letters Patent No. 368,563, dated August 16, 1887.

Application filed March 18, 1885. Serial No. 159,260. (Model.)

*To all whom it may concern:*

Be it known that I, DAVID G. BROWN, a citizen of the United States, residing at Philadelphia, in the State of Pennsylvania, have invented certain new and useful Improvements in Micrometer Pipe-Gages; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a device adapted to measure the inside diameters or the differences in the dimensions of two or more diameters of a pipe or cylinder with increased exactness or accuracy; and it consists in the arrangements and combinations of parts, substantially as will be hereinafter set forth, and finally embodied in the clauses of the claim.

Referring to the accompanying drawings, in which like letters of reference indicate corresponding parts in each of the several figures, Figure 1 is a plan of the improved gage. Figs. 2 to 6 are views of the several parts thereof in detail, Fig. 3 being a side view of a ring or collar to fit over the portion marked $a$. This collar, however, is not essential to my invention. Figs. 7 and 9 are views of certain end pieces or tips used in lieu of shorter ones when it is desired to give the gage increased length. Fig. 8 is a view of the gage when one of said longer pieces is used in its composition. Fig. 10 is a view of a sectional tip employed when it is desired to make the gage still longer, to be adapted to measure cylinders of a comparatively large size; and Fig. 11 illustrates the mode of measuring the pipe or cylinder.

In said drawings, $a$ is a slotted or split tube having ears $b\ b$, by which the sections made by the slot may be drawn together by screws $c\ c$ to take up wear. Said tube is threaded on the inside to receive a threaded finger-piece, $d$, having a milled flange, $d'$, whereby the said piece may be the more easily turned, and a pointed end, $e$, to engage the curved wall of the tube to be measured at one point, as shown in Fig. 11. Upon and forming a part of said finger-piece $d$ may be screwed a collar, $f$, a graduated flange of which is adapted to overlap and inclose a portion of the tube $a$, which portion has an indicating-mark, $g$, running longitudinally therealong, by which the distance of movement of the graduated piece may be calculated. The graduated flange may be of one piece with the finger-piece $d$.

The screws of finger-piece and tube $a$ are provided with forty threads to the inch, while the flange $f$ of said finger-piece is marked off into twenty-five equal spaces by graduative marks. It will thus be evident that by turning the collar and finger-piece upon one another a distance equal to one of the spaces between the graduation-marks the length of the tube and finger-piece, taken together, will be increased or reduced one one-thousandth of an inch. Further movement increases or diminishes the length relatively. At the opposite end of the tubular portion $a$ the same is pointed or provided with a removable pointed tip, $h$. For measuring small tubes these tips are comparatively short, as in Fig. 2. In Figs. 7 and 9 are shown larger ones, for use in measuring tubes of larger caliber.

For measuring still larger tubes or cylinders the tips are made in sections. (Shown in Fig. 10.) These are, first, a coupling-piece, $h'$, to fasten the sectional tip to the tube $a$; next, a tube, $i$, one end of which is slotted or split, as indicated; then a nut, $j$, having a tapering threaded interior, tending, when screwed on the split tube, to close the jaws thereof, and, finally, a pointed adjustable rod, $l$, which is held firmly in the tube by the clamping-nut $j$. The tips, it will thus be seen, are interchangeable, the one to be selected depending on the size of the tube or cylinder to be measured.

The parts being in their several relative positions, the size of bore of a tube or the differences in the dimensions of the same may be readily evinced by turning the graduated finger-piece and noticing the difference between the indicating-mark and a given graduation which had previously tallied with said mark.

What I claim as new is—

1. In combination, a threaded piece, $a$, a ring or collar fitted thereon, as shown and described, a threaded piece, $d$, a graduated collar or piece, $f$, and a removable tip, $h$, said parts being arranged and adapted to operate substantially as set forth.

2. In combination, a threaded and split tube, $a$, having ears $b$, screws $c$, and an indicating-mark, $g$, a graduated piece, $f$, a threaded and pointed piece, $d$, a pointed tip removable from said tube $a$, and connected with a split tube, $i$, and a pointed rod, $l$, said parts being arranged and adapted to operate substantially as and for the purposes set forth.

3. In combination, in a pipe-gage, a threaded piece, $a$, having an indicating-mark, a threaded piece, $d$, a graduated piece, $f$, and a removable tip, $h$, said parts being arranged and combined substantially as set forth.

4. In combination, a threaded piece, $a$, a threaded and graduated finger-piece, and a tip adapted to be coupled to said threaded piece $a$, said tip being formed of separable sections, substantially as set forth.

5. In combination, the threaded and split tube $a$, having ears $b$ and screws $c$, and an indicating-mark, $g$, a graduated piece, $f$, a threaded and pointed piece, $d$, and a pointed tip removable from said tube $a$, consisting of a split tube, $i$, coupling $h'$, nut $k$, and pointed rod $l$, all said parts being arranged and combined substantially as and for the purposes set forth.

In testimony that I claim the foregoing I have hereunto set my hand this 14th day of February, 1885.

DAVID G. BROWN.

Witnesses:
CHARLES H. PELL,
FREDK. F. CAMPBELL.